Figure 1:
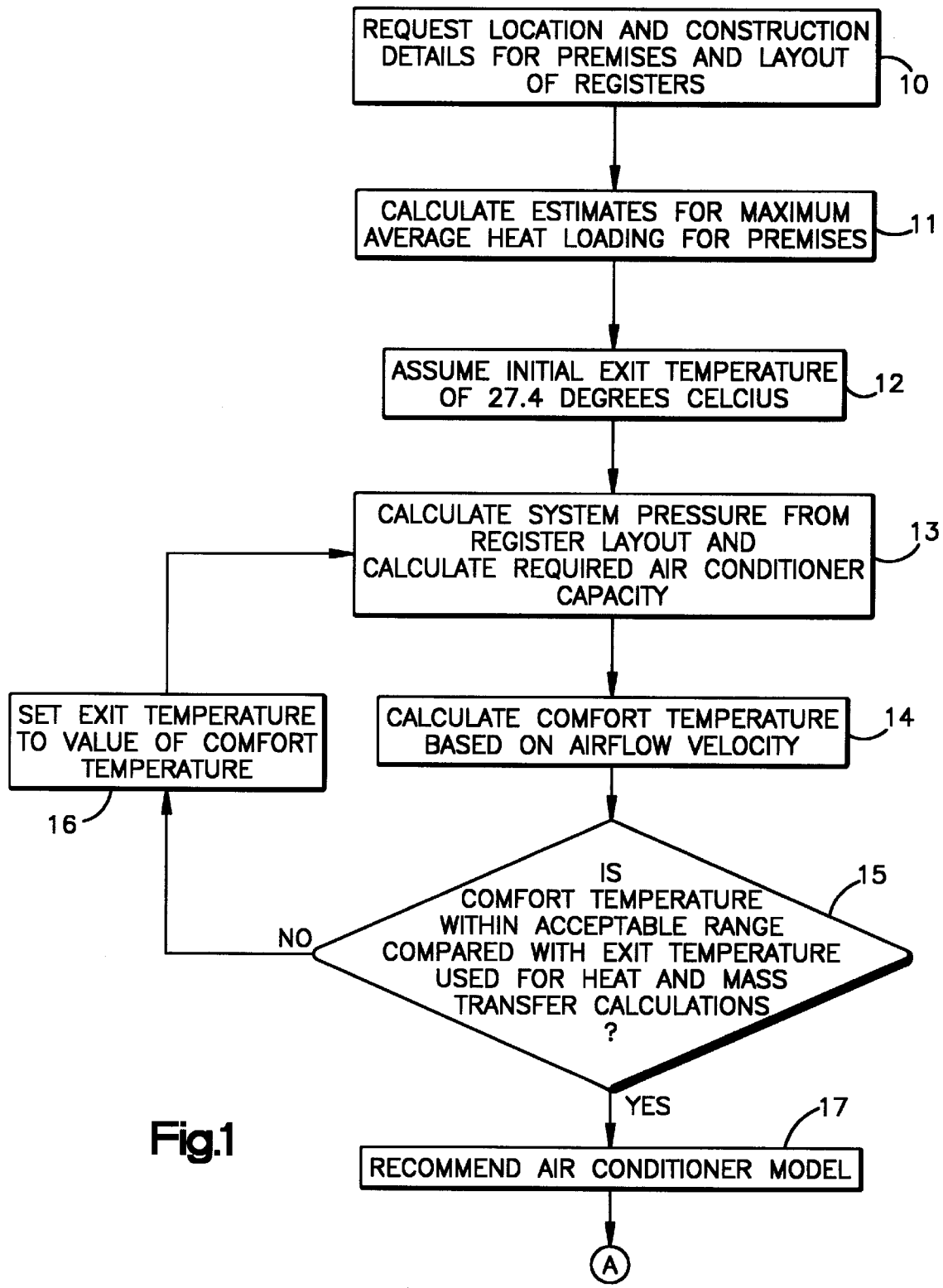

United States Patent [19]
James

[11] Patent Number: 5,899,080
[45] Date of Patent: May 4, 1999

[54] AIR CONDITIONING METHOD AND SYSTEM

[75] Inventor: Robert Wilton James, Crafers, Australia

[73] Assignee: F.F. Seeley Nominees Pty Ltd, St Marys, Australia

[21] Appl. No.: 08/935,547

[22] Filed: Sep. 23, 1997

[30] Foreign Application Priority Data

Sep. 23, 1996 [AU] Australia ................... P02514

[51] Int. Cl.⁶ .................................. F25D 17/06
[52] U.S. Cl. .................................. 62/89; 62/122
[58] Field of Search .................... 454/236; 62/89, 62/127, 171

[56] References Cited

U.S. PATENT DOCUMENTS 4,754,919  7/1988  Otsuka et al. .

*Primary Examiner*—Henry A. Bennett
*Assistant Examiner*—Susanne C. Tinker
*Attorney, Agent, or Firm*—Watts, Hoffmann, Fisher & Heinke Co., L.P.A.

[57] ABSTRACT

An air conditioning installation designed with regard to achieving a comfort temperature as well as meeting heat load requirements for a conditional space. The comfort temperature being dependent upon the velocity of the air flow in the space and the design being established by an iterative process until the comfort temperature differs from the exit temperature of the space within predetermined limits.

7 Claims, 2 Drawing Sheets

AIR CONDITIONING METHOD AND SYSTEM

The present invention relates to a method and means of air conditioning premises to be occupied by people. In particular, the method takes into account factors directly relating to the comfort of occupants within the area to be conditioned and is suitable for evaporative cooling or refrigerated air conditioning installations of cooling and reverse cycle types.

Prior Art methods primarily consist in estimating the required air conditioner capacity for an installation based upon a rate of change of air for various locations depending upon local environmental conditions. In more recent times, estimates of the required air conditioner capacity have been based upon a method referred to as the heat and mass transfer method. However, this method is based upon the sustaining of a difference in air temperature between air entering and exiting the premises with the supply of air at a sufficient rate to effect the heat and mass transfer from the premises. This method only takes into account the heat loading placed upon the premises and hence the heat and mass required to be transferred. No account is taken of the likely effect that the shifting of the volume of air through the premises is likely to have on the comfort of the occupants. As a result, it has been known for air conditioning installations based upon this method for there to be an uncomfortably high air flow rate for the occupants. Having selected an air conditioner capacity for particular premises, the selection of the remaining components of the system, namely the ducting and registers, is generally based upon the experience of the installer. The design of the system ducting and register size and location is affected by the various heat loadings of each room of the premises and the requirement for the air pressure to be balanced amongst all the ducting attached to the main system air conditioner. A well designed system will provide a balance in the air pressure within the ducting emanating from the main air conditioner whilst maintaining a greater volumetric flow of air in the locations of the premises that are subject to a greater heat loading. As the number of variables that may be selected in the layout of an air conditioning system is relatively large, currently the efficiency and effectiveness of the final layout is highly dependent upon the experience of the installer. Even with a highly experienced installer, some installations are sufficiently complex to exceed the ability of the installer to design an optimal system and may result in some trial and error in the installation and commissioning process. Any resort to trial and error in the installation process results in a higher cost of installation.

It is an object of this invention to provide a method of air conditioning premises that takes into account the velocity of the air flow in the premises and the resulting level of comfort for people occupying the premises.

It is a further object of this invention to provide a method of air conditioning a space that enables an operator to effect an installation in its entirety thereby substantially reducing the required level of experience required to effect an installation as compared with prior art methods.

In one aspect the present invention provides a method of air conditioning a space comprising applying conditioned airflow to the space at a temperature and at a velocity that is comfortable to occupants of the space, said method comprising:

(i) calculating the volume of air to be replaced within the space per unit of time based upon (a) a nominal exit temperature for the air from the space, (b) approximated heat loads at a plurality of locations within the space;

(ii) calculating the comfort temperature as a function of the airflow velocity that results from the calculated volume of air to be replaced per unit of time;

(iii) comparing the calculated comfort temperature with the nominal exit temperature;

(iv) repeating steps (i), (ii) and (iii) for a revised nominal exit temperature until a predetermined difference in magnitude is achieved between the comfort temperature and the exit temperature;

(v) estimating an air conditioning capacity for the space based upon a mass transfer and the comfort temperature to be experienced by occupants of the space; and (vi) installing air conditioning system of the estimated capacity to supply the space with conditioned air.

In a preferred form the method as aforesaid takes account of the configuration of ducting and air flow outlets and inlets in the ducting when calculating the volume of air to be replaced per unit of time.

The calculation (i) as stated above is the well known standard balance heat load calculation as employed in the design of air conditioning installations.

The inventive method in one embodiment is carried out by performing a first set of calculations based upon the volume of air to be replaced within a dwelling per unit of time, said first set of calculations being based upon a nominal exit temperature for the air from the premises, various approximated heat loads for the various locations of the premises and basic ducting and register configuration. A second set of calculations are then performed to calculate the comfort temperature resulting from the velocity of the air flow that would result from the rate of air replacement calculated by said first set of calculations. Upon performing said second set of calculations and determining a comfort temperature value, comparison of this value with the nominal exit temperature used in said first set of calculations provides a temperature difference which can be reduced to an acceptable magnitude by repeating the first set of calculations with a revised value for the exit temperature. Upon iteration between these two sets of calculations and arriving at an acceptable temperature difference between the exit temperature and the comfort temperature of the premises, an air conditioning capacity for the installation is estimated based upon the mass heat transfer and the comfort level to be experienced by occupants which itself is based upon the velocity of air flow within the premises.

In one embodiment of this invention, a computer is programmed to request from an operator the relevant dimensions of the various rooms of the premises for which an air conditioning system is required. In addition to the various main room dimensions, a value for the total living area of the house is requested to accommodate for the areas of the premises that are not located within main rooms (eg hallways, entry ways).

The computer program also requests from the operator information regarding the construction of the premises including the area and direction of window panes and whether or not any one of these external parts of the premises are shaded during the summer months. The type of construction of the premises is also requested to establish an approximation of the thermal conductivity of the various components of the premises (ie walls, ceilings etc). In addition, this program requests from the operator information regarding the number of registers to be used throughout the premises and the distribution of the registers amongst ducting runs.

The computer program comprises a database of locations within an area (eg state or country) and the dry and wet bulb temperatures during the summer or winter months for that location. It will be recognized that it is not necessary for a database containing this information to be internal to the program and it could be separate to and interrogated by the main program. This information was obtained for Australia from report number DA9a of the Mechanical Engineering Services Design Aids entitled "Air Conditioning Systems—Design Temperature Data", the contents of which are incorporated herein by reference. Upon the operator responding with details regarding the location of the premises within the area, the computer program interrogates the database to establish the dry and wet bulb temperatures that the premises is likely to be subjected to as its design heating or cooling condition. In association with the information provided in relation to the physical layout and dimensions of the premises, the computer program calculates the expected maximum heat loadings for each of the rooms within the premises. Upon calculating the heat loadings that the air conditioning system must accommodate and based upon a nominal exit temperature of 27.4° C. as a summer design condition which provides comfort, or an appropriate comfort condition for winter for the air exiting or returned to the air conditioning system and the ducting and register layout, the computer program then calculates the system pressure and the heat and mass transfer required and hence the rate and volume of air required to effect said approximated heat and mass transfer.

The calculated volume of air that is required to be replaced and the rate at which the air is to be replaced enables the computer program to calculate the average velocity of the air flow within the rooms of the premises. Based upon a relationship developed by the inventor between the average velocity of air flow and the comfort temperature, the resulting comfort temperature can be calculated for the velocity of air flow that would result based upon the calculations for the required heat and mass transfer. As used herein in one preferred from the "comfort temperature" is defined as comfort temperature $°C.=28.02(Velocity\ in\ meters/second)^{0.0495}$. The development of this relationship was based upon the experimental data collected and reported by Mr. P. O. Fanger as a part of his research at the Laboratory of Heating and Air-Conditioning, Technical University of Denmark and at the Institute for Environmental Research, Kansas State University and published in "Thermal Comfort", McGraw-Hill 1972, ISBN 0-07-019915-9 the contents of which are incorporated herein by reference. It will be understood that the formula which defines the relationship between air flow velocity and comfort temperature can be varied form the above preferred formula while bearing in mind that the comfort temperature is velocity dependent. The comfort temperature represents an estimate of the optimal temperature for the air flowing past an occupant at the velocity calculated as a result of the volume of air that would be provided to effect the heat mass transfer.

If the comfort temperature calculated by the abovementioned relationship between velocity of air flow and temperature is the same as the exit temperature selected for the heat mass transfer calculations, a best compromise between competing considerations is achieved and consequently the best estimation of air conditioner capacity and thereby efficiency is effected. Alternatively, the greater the difference between the exit temperature of the heat mass transfer calculations and the comfort temperature, the less optimal is the approximation of the air conditioner capacity for the premises concerned.

To establish an acceptable result, upon calculating the comfort temperature, the computer program that assigns this comfort temperature value to be the exit temperature for the heat mass transfer calculations. The purpose of the assignment of the exit temperature to that of the calculated comfort temperature is to effect a new set of calculations to result in a convergence between the exit temperature and the comfort temperature. It will be recognised of course that the assignment of a new exit temperature may be based upon some combination of the previous exit temperature and calculated comfort temperature. Upon changing the exit temperature for these calculations, the heat loads of each of the rooms of the premises changes and as a result, the required volume of air to be replaced per unit time is altered. This change in heat and mass transfer required generates a new value for the average velocity of air flow in the rooms and as a result, a new value for the comfort temperature results. This iteration is continued until an acceptable difference exists between the comfort temperature, calculated by the aforesaid relationship, and the exit temperature provided for the heat mass transfer calculations. At the point of completing the iteration, the best compromise is achieved between the competing considerations effecting the appropriate amount of heat mass transfer and the comfort level of the occupants of the premises. The result is a better estimation of the required air conditioning capacity for the premises to achieve the required heat mass transfer whilst accommodating occupant comfort.

The computer program also comprises a database of information comprising the operational parameters of various air conditioners. From information, the program calculates the capacity (kg/sec) of each of the air conditioners for the particular air density at that location and for a particular system pressure presented to the air conditioner. Based upon the required cooling capacity as calculated by the program, the most appropriately sized air conditioner can be recommended by the computer program. Again, it will be recognised that it is not necessary for the database to be internal to the program as it could be separate from and interrogated by the main program.

Having recommended a specific air conditioner model, the computer program then performs a further set of calculations based upon the actual capacity of the air conditioner selected to calculate the optimal selection of ducting size and register size to effect the best distribution of conditioned air throughout the premises. A two step process is employed to best establish a design with an air pressure balance between the various ducting runs. As the system in operation will automatically balance the air pressure between the various ducting runs, a design process which checks this balance in the designed system ensures that the actual operation of the system will reflect the designed distribution of air flows throughout the premises. The previously entered information in relation to the heat loading of each of the rooms is used as a part of this calculation process. Upon completion of the two step process, if a particular ducting run is sufficiently out of balance with the remaining runs, it is highlighted as needing a damper to be included in the run.

Upon completion of the entire process, the computer program provides a detailed design layout including the size and location of all ducting and registers. As all of the components required for the air conditioning system have been selected by the computer program, the program can also provide a complete parts list for the installation.

The resultant effect of this new method if greater efficiency of the installed air conditioning system as this method enables the calculation of system requirements based upon the resulting comfort of the occupants in addition to the required heat and mass transfer. The effect of this new method is particularly noticeable in sub-tropical regions where the wet bulb temperature is relatively higher as compared with dry regions. The increased wet bulb temperature causes the heat and mass flow calculations to increase the volume of air required to cool the premises. However, the increased air flow resulting from this calculation may cause increased discomfort for the occupants as the increased air velocity may cause greater discomfort as compared with an increased temperature. In these situations, the occupants can tolerate a higher temperature by virtue of the higher air velocity and hence remain close to neutrally comfortable. Depending upon the specific location and physical environment of the premises to be conditioned, use of this method may result in a substantially lower capacity air conditioner being utilised to air condition premises. This has an obvious beneficial effect upon the efficiency and cost of the air conditioning installation.

Figure 2:
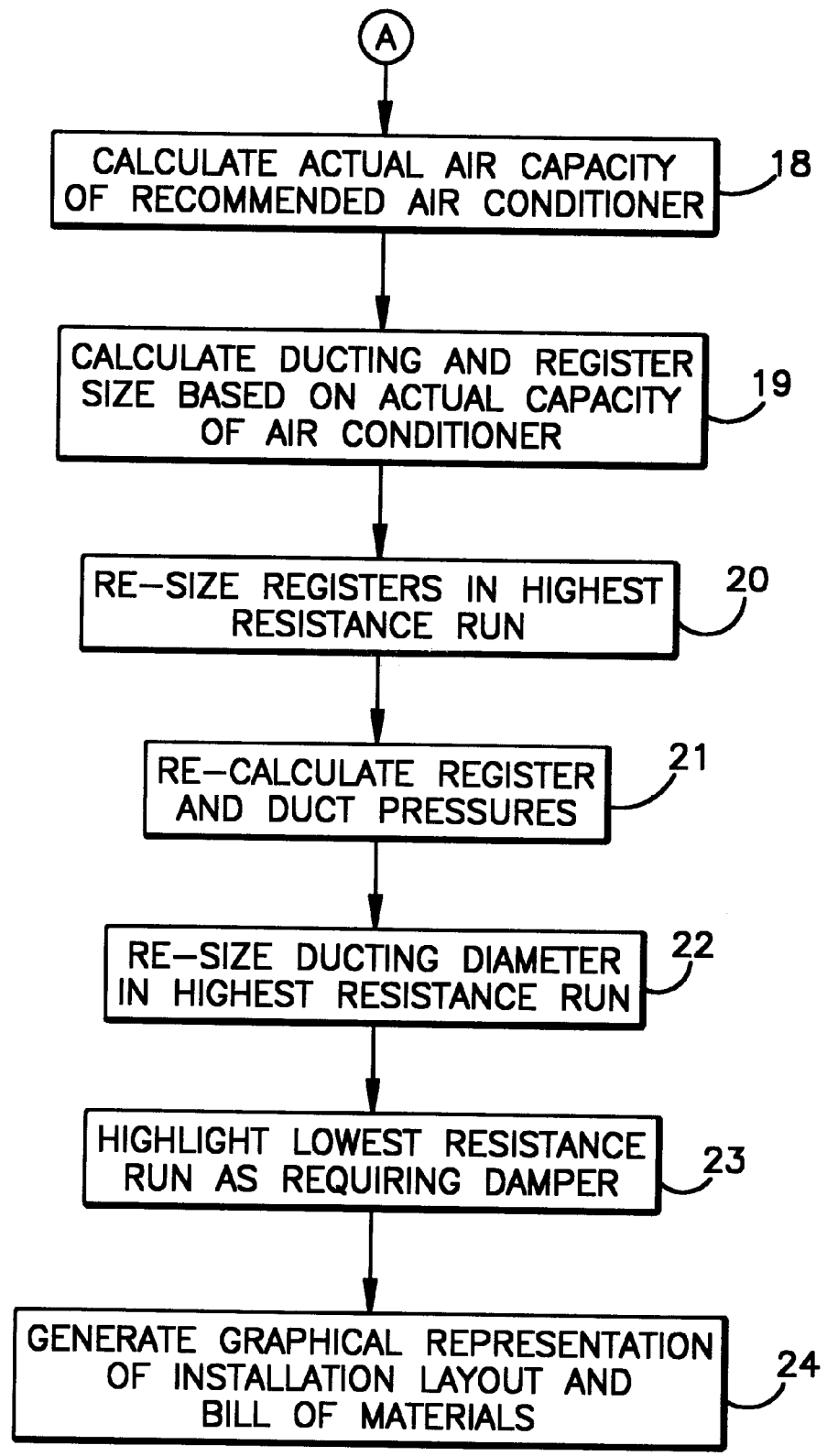

Although the broadest form of the invention need not necessarily include all of the abovementioned preferred details an embodiment of the invention will now be described hereafter with reference to and as illustrated in the accompanying drawings, in which:

FIG. 1 is a flow chart detailing the basic steps involved in determining the capacity of an air conditioner for an installation in accord with the method of this invention; and FIG. 2 is a flow chart detailing the basic steps involved in determining the components other than the conditioning unit required by this embodiment.

Prior to performing any calculations in relation to the heat and mass transfer and the comfort temperature of an installation, a computer program of this embodiment requests specific information relating to the physical environment of the premises to be conditioned, the physical layout and construction of the premises and the number and location of registers throughout the premises at 10 in FIG. 1. The computer program then interrogates its own internal database at 11 to establish the information stored inlcuding the dry bulb and wet bulb temperatures during summer for the location of the premises the altitude of the location, the dry bulb and wet bulb temperature and the saturation efficiency.

From the information obtained at steps 10 and 11, the computer program calculates the air conditioner outlet temperature as follows for evaporative coolers:

$$\text{Outlet temperature} = DBo - \eta(DBo - WBo)$$

Where
DBo=dry bulb temperature
WBo=wet bulb temperature
η=saturation efficiency

The program at step 11 then calculates the various heat loads of the premises as follows Ceilings $$\text{Heat Load}_c = \Sigma(\text{Room Area}) = \text{conductivity} \times (DBo - Tex + 10)$$

where
Heat Load$_c$=the heat load for the ceiling
Tex=exit temperature

Walls $$\text{Heat Load}_w = (\Sigma(\text{Wall Length}) \times (\text{Average Height}) = \Sigma(\text{Window Area})) \times \text{conductivity} \times (DBo - Tex)$$

Window (conduction element)

$$\text{Head Load}_{winc} = \Sigma(\text{Window Length}) \times (\text{Window Height}) \times \text{Conductivity} \times (DBo - Tex)$$

where
Heat Load$_{winc}$=the heat load due to heat conduction through the windows of the premises Windows (radiation element)

$$\text{Heat Load}_{winr} = \Sigma(\text{Window Length} \times \text{Window height} \times \text{radiation factor})$$

where
Heat Load$_{winr}$=the heat load due to heat radiation to or from the windows of the premises Occupants
Each occupant is estimated to contribute 80 watts Other Heat Loads
Allow for the inclusion for extraneous known or unknown heat loads.

Having calculated the various contributions to the heat loading of the premises, the individual components are then summed to produce a total heat load of the premises. The computer program then progresses to step 12 wherein the exit temperature of air from the premises is initially set to a nominal value of 27.4 degrees Celsius. At step 13, the computer program then performs numerous calculations in relation to the air mass flow required, altitude calculations and the resulting air conditioning system pressure required.

Air Mass Flow
The air mass flow required to match the previously calculated heat load is calculated as:

$$AMF = \frac{\text{Total Heat Load}}{\text{Specific Heat} \times 1000 \times (Tex - To)}$$

where
AMF=the required air mass flow to compensate for the heat loading of the premises
Specific heat=1.023 (KJ/kg°K)

Altitude Calculations
Pressure at altitude
$P_{Alt} = 1013.25 \ e^{(-0.000116497 \times Alt)}$
where
$P_{air}$=air pressure at altitude
Alt=altitude of premises in meters above sea level Density at altitutde $$\rho Alt = \frac{PAlt}{(1013.25 \times 0.85)} \ (Kg/m^3)$$

Standard Density $$\rho std = 1,2945 \ (kg/m^3)$$

Density Ratio $$DR = \frac{\rho Alt}{\rho std}$$

System Pressure $$\text{System Pressure} = \text{Dropper loss} + \text{Average [Register} + \Sigma(\text{Duct loss}) \text{ each run]}$$

The performance details of numerous air conditioners are stored internally in the computer program and this performance information is used to calculate the mass flow rate for each unit The mass flow for each air conditioner is calculated as follows:

$$\text{Cooler mass flow} = (x - y \times Ps) \times \left(\frac{1}{DR}\right)^{0.3333} \times \rho Alt$$

where x and y are characteristic constants for each model of air conditioner $P_s$=the system pressure previously calculated At this stage, the program progresses to step 14 wherein the comfort temperature is calculated as follows:

Air Flow $$\text{Air Flow} = \text{Mass Flow} \times 3600 \times \rho Alt$$

where $\rho Alt$=the air density at altitude of the premises

Velocity

Air Velocity =

$$\frac{\text{Air Flow}}{(\text{External Wall Length} \times \text{Average Ceiling Height} \times 3600 \times 0.02)}$$

Comfort temperature $$\text{Comfort temperature} = 28.02 \times (\text{Velocity})^{0.0135}$$

At this stage, the computer program progresses to step 15 wherein the calculated comfort temperature is compared with the exit temperature used for the heat and mass transfer calculations. If the difference between these temperatures exceeds an acceptable amount, then the program will progress to step 16 wherein the exit temperature will be replaced with the comfort temperature calculated at step 14. It should be noted that various alterations to the exit temperature may be implemented to progress the iteration to an acceptable temperature difference. For example, the next iteration could be based upon an exit temperature value being equal to a value that is approximately half way between the exit temperature and the calculated comfort temperature. Having altered the exit temperature, the program then re-executes step 13 to calculate a revised air conditioner capacity based upon a new set of heat and mass transfer values. At completion of step 13, the program then re-executes steps 14 and 15 again with a revised set of results. Again, if the temperature difference between the exit temperature and the comfort temperature is unacceptable the program will again progress to step 16. Alternatively, if the temperature difference is acceptable the program will then proceed to step 17 wherein an air conditioner from the internal database will be recommended.

Having obtained a recommended air conditioner model from the program, the remaining aspects of the installation are required to be finalised.

With reference to FIG. 2, the program then proceeds to step 18 wherein the program performs a re-calculation of the actual air capacity based upon the recommended air conditioner. As the program will recommend the next highest air conditioner capacity as compared with the calculated requirement, the actual capacity of the selected model will generally be higher than the calculated requirement.

The program then proceeds to step 19 wherein the ducting and register sizes are re-calculated based upon the actual capacity of the selected air conditioner.

Registers

Register size is calculated to give an air velocity of about 2.5 m/sec through the area of the register, adjusted for the appropriate size of commercially available registers. This particular value of air velocity results in the smallest register size consistent with low noise generation.

Dropper Loss

Dropper loss is calculated from known equations for losses in rectangular ducts and factored for additional losses due to the change of air flow at the bottom of the dropper.

Register Loss

Register loss is calculated from the following relationship $$\text{Register Loss} = 3.95124 \times (\text{velocity})^{1.37327}$$

Ducting Loss

As for the calculation of dropper loss, the ducting loss is calculated using known equations for losses in rectangular ducts (see 1993 edition of ADHRAE Fundamentals).

Total Pressure Loss $$\text{Total Pressure Loss} = \text{Dropper Loss} + \text{Average [Register} + \Sigma(\text{Duct Loss}) \text{ each run]}$$

Having calculated the ducting and register sizes based upon the capacity of the selected air conditioner, the back pressure presented by each ducting run is compared. As a first attempt to create an improved balance between the ducting runs the program proceeds to step 20 wherein the registers are re-sized. The program then proceeds to step 21 wherein the register and ducting pressures are re calculated based upon the re-sizing of the registers. This provides revised values for the back pressure presented by each ducting run. In attempting to provide yet a better balance between the pressures of the individual ducting runs, the program then proceeds to step 22 wherein the program adjusts the value for the ducting diameter size in the highest resistance run. Again, the pressures of each of the ducting runs are re-calculated. At this stage, the program proceeds to step 23 wherein the lowest resistance run is determined and highlighted to the operator as potentially requiring a damper during installation. The program then proceeds to step 24 wherein a graphical representation of the installation layout is provided for the operator and a bill of materials is also generated.

At this stage the method of determining requirements for air conditioning the premises is complete. The incorporation of occupant comfort considerations within the area to be conditioned into the calculations for air conditioner capacity and system layout results in an air conditioning installation having benefits as compared with those designed using prior art methods.

It will be appreciated by persons skilled in the art that numbered variations and/or modifications may be made to the invention as shown in the specific embodiments without departing from the spirit or scope of the invention as broadly described. The present embodiments are, therefore, to be considered in all respects as illustrative and not restrictive.

I claim:

1. A method of air conditioning a space situated at a predetermined geographic location, said method comprising applying conditioned air flow to the space at a temperature and at a velocity that is comfortable to occupants of the space, said method comprising:

(i) calculating the volume of air to be replaced within the space per unit of time based upon (a) a nominal exit temperature for the air from the space (b) approximated heat loads at a plurality of locations within the space;

(ii) calculating the comfort temperature as a function of the airflow velocity that results from the calculated volume of air to be replaced per unit of time;

(iii) comparing the calculated comfort temperature with the nominal exit temperature;

(iv) repeating steps (i), (ii) and (iii) for a revised nominal exit temperature until a predetermined difference in magnitude is achieved between the comfort temperature and the exit temperature;

(v) estimating an air conditioning capacity for the space based upon a mass heat transfer and the comfort temperature to be experienced by occupants of the space; and (vi) installing an air conditioning system of the estimated capacity to supply the space with conditioned air.

2. A method as claimed in claim 1 wherein the calculation of the volume of air to be replaced per unit of time is also based upon (c) the configuration of ducting and air flow outlets and inlets in the ducting.

3. A method as claimed in claim 1 wherein the comfort temperature equals $38.02 \times \text{velocity}^{0.0435}$ of the air flow, where the temperature is in °C. when the velocity is in meters/second.

4. A method as claimed in claim 1 wherein the nominal exit temperature is 27.4° C.

5. A method as claimed in claim 1 wherein the air conditioning system is an evaporative cooler system.

6. A method as claimed in claim 1 wherein the air conditioning system is a refrigeration system.

7. A method as claimed in claim 6 wherein the air conditioning system is a reverse cycle system.

* * * * *